May 30, 1950 — R. W. OLSON — 2,509,651
SEISMOGRAPH COMPOSITING SYSTEM
Filed July 15, 1947
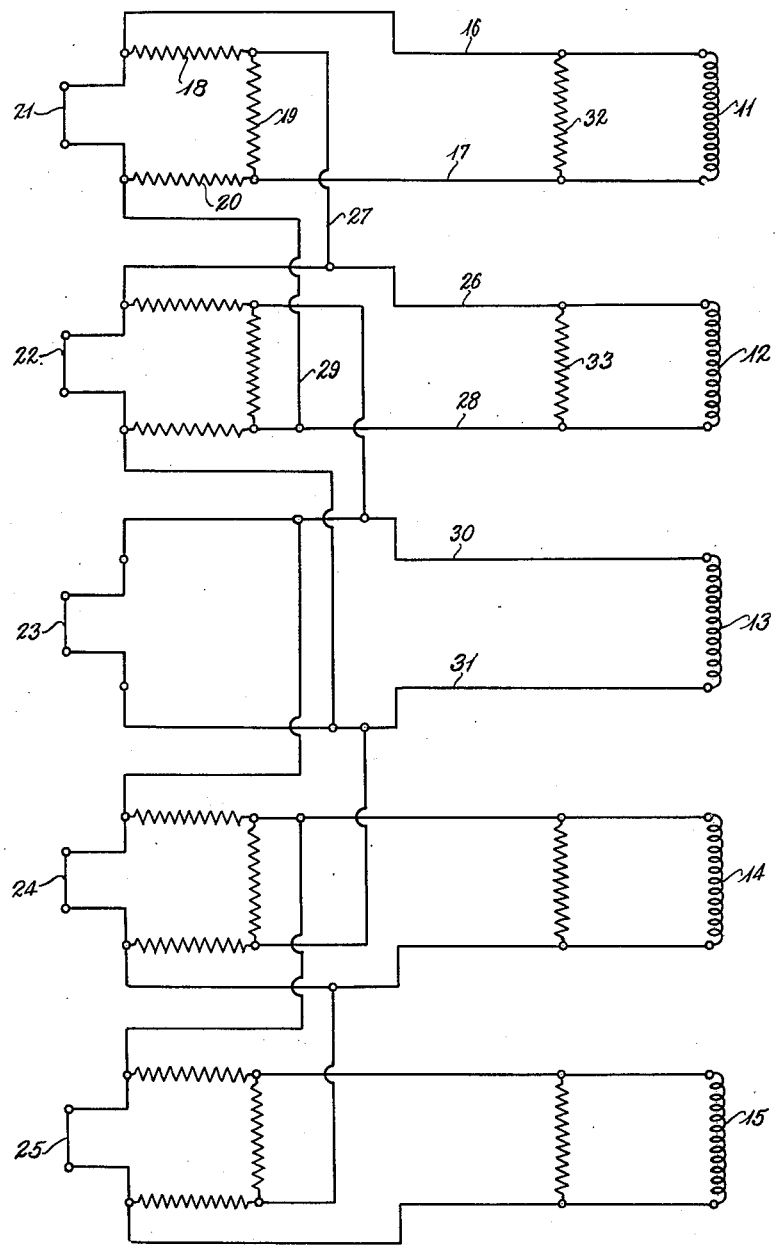
Inventor
Robert W. Olson
By Stevens, Davis and Miller
Attorneys Patented May 30, 1950

2,509,651

UNITED STATES PATENT OFFICE 2,509,651

SEISMOGRAPH COMPOSITING SYSTEM

Robert W. Olson, Dallas, Tex., assignor to Geophysical Service, Inc., Dallas, Tex., a corporation of Delaware Application July 15, 1947, Serial No. 761,015

2 Claims. (Cl. 178—44)

This invention relates to an improved method and apparatus for seismic prospecting and more particularly to a method and apparatus for producing composite recordings of seismic waves.

Seismic prospecting has long been accomplished by locating a series of detectors for seismic waves at spaced points on the earth's surface, connecting each of these detectors through suitable amplifying equipment to one of the elements of a multi-element recording galvanometer, thereafter detonating a charge of explosives at some point on the earth's surface and recording the trains of seismic waves received at each of the detectors. By a comparison of the trains of seismic waves received at the recording galvanometer, and by the configurations of trains of these waves, much information may be obtained about the subsurface strata.

In most prior methods and apparatus the waves received at each detector have been independently amplified and independently recorded, that is, there has been no combining of the waves received at the various detectors prior to recording. In some instances, and particularly in recent years, it has been found desirable to combine the signals from two or more detectors prior to recording. This is known as compositing and is generally accomplished by combining the outputs of the first and second detectors, the second and third detectors, the third and fourth detectors and so on. In referring to the first, second, third and fourth detectors, it is to be understood that, in general, the detectors are arranged in substantially a straight line extending away from the point where the charge of explosives is to be detonated, and that the numbering may start with the detector closest to the point of explosion and progress in regular order outwardly from this point.

The advantage of compositing is that it produces a smoother appearing record, in which minor local disturbances tend to be eliminated from the record. The record, for this reason, is generally easier to interpret, and often yields more readily to intepretation, because disturbances that may appear on one detector tend to be averaged out if the record is a record of the output of two or more detectors.

Difficulty is encountered in compositing because of cross feeding from one detector circuit into another. Thus, if the output of the first detector is combined with the output of the second detector to form one trace on the seismic record, and the output of the second detector is additionally combined with the output of the third detector to form another trace on the record, there is a distinct possibility of the output of the first detector cross feeding into the combined output of the second and third detectors. Furthermore, if the compositing is performed prior to amplification, since the first detector is normally closer to the point of explosion than the second detector, the signal from this detector is usually stronger than the signal from the second detector and hence a combination of these two signals is apt to more accurately represent the output of the first detector than it is to represent a fifty-fifty combination of the outputs of the two detectors.

In order to avoid these difficulties and to provide a method and apparatus for making better composite recordings, the present invention provides a method and apparatus in which the signals from the several detectors are first separately amplified, under volume control conditions which bring all of the signals to about the same general level of amplitude and are thereafter combined by pairs, in a one and two, two and three, three and four, arrangement, in such a manner and by a type of circuit that will prevent any possibility of cross feeding. Furthermore, the method of combining or compositing the signals from adjacent detectors or channels is such as will provide a true fifty-fifty mixture of signals from adjacent detectors or channels, and not some mixture in which the signals of one channel will greatly predominate over the signals of the adjacent channel.

Still further, the present invention provides for the making of a number of records or traces equal to the number of detectors by an arrangement in which one of the intermediate detectors not only has its output combined with a detector on either side to produce two composite traces, but also has its output directly recorded to produce still another trace. Thus, the final record will contain not only a series of composite traces, but will also contain one direct trace, representing the output of only one detector in the string of detectors.

Further, under this system all compositing can be accomplished at the recording oscillograph at very low impedance with no circuits grounded.

Still another advantage lies in the fact that by properly arranging connections with respect to the end or ends of the spread nearest the shot point it is possible to obtain "straight" or direct connected first breaks with a composited record immediately thereafter. First breaks are of great importance since they are needed for computing weathering depth. This system provides this feature with utmost simplicity and probably permits a reduction in the number of shots fired.

Further details and advantages of this invention will be apparent from the drawing and the following detailed description:

In the drawing the single figure is a schematic representation of the preferred form of compositing system in accordance with this invention. The usual seismograph system includes an explosive charge, a means for detonating this charge, a series of seismometers or detectors located at various positions on the earth's surface, and a volume controlled amplifier for each detector or group of detectors. The output of each of these amplifiers is usually connected through a transformer to an element of a multi-element recording galvanometer. Often the detonating circuit is similarly connected to one of the elements of the recording galvanometer so that the time of detonation can also be recorded.

The present invention is concerned only with the connections between the outputs of the several amplifiers and the several elements of the multi-element recording galvanometer to which they are connected. Therefore, the drawing accompanying this application, illustrates schematically only these connections, and omits as unnecessary the remainder of the system.

Accordingly, signal trains are supplied to inductances 11, 12, 13, 14 and 15, which may be the secondaries of amplifier output transformers, of amplifiers attached to seismometers or detectors (not shown). Direct, resistive, or capacitive coupling may replace the inductive coupling utilized in the illustration, in which case the trains of seismic waves will be fed directly into the conductors which are shown in the drawing as being connected to the several inductances.

In the preferred form of this invention, as illustrated in the single figure, currents from the first inductance 11 are applied through conductors 16 and 17 to the opposite corners of an electrical bridge which consists of three impedances 18, 19 and 20, of equal value, and one element 21 of a multi-element recording galvanometer. The impedance of the galvanometer element 21 and the connections to it is made equal to the impedance of each of the impedances 18, 19 and 20. Thus, a four-legged bridge is provided, having an equal impedance in each leg. Under such circumstances one-half of the current from inductance 11 will pass through the galvanometer element 21.

The second inductance 12 is connected across the opposite corners of the same bridge, formed by impedances 18, 19 and 20 and galvanometer element 21, by means of conductors 26, 27, 28 and 29. Thus, in a similar manner one-half of the current from the second inductance 12 will pass through the galvanometer element 21. Since the first inductance 11 and the second inductance 12 are connected into opposite corners of a balanced bridge, the current from one of the inductances cannot induce a current into the other, although both affect the action of the galvanometer element 21.

In an exactly similar manner the second and third inductances 12 and 13 may be connected to a second balanced bridge circuit operating a second galvanometer element 22. The third and fourth inductances 13 and 14, and the fourth and fifth inductances 14 and 15 may be similarly connected into other balanced bridge circuits to operate other galvanometer elements 24 and 25.

This provides for the operation of four galvanometer elements from the outputs of five inductances. In order to produce as many traces as there are seismometers, and hence inductances, a fifth galvanometer element 23 may be operated directly from the output of the third inductance 13. This is done by directly connecting the inductance 13 to the galvanometer element 23 through connectors 30 and 31.

In order to load all of the inductances 11, 12, 13, 14 and 15 alike, it is desirable to shunt certain of the inductances by an impedance. Thus, if the galvanometer elements each have an impedance equal to $z$ and each of the legs of each of the bridges has the same impedance, the first inductance 11 would have in its external circuit an impedance equal to $z$. The second inductance 12 would have in its external circuit an impedance equal to $z/2$. The third inductance 13 would have in its external circuit an impedance equal to $z/3$. Thus, in order to balance the loads on the three inductances it would be necessary to shunt the external circuit of the first inductance 11 through an impedance equal to $z/2$, and the external circuit of the inductance 12 through an impedance equal to $z$, to make the impedance of the external circuits of the three inductances equal. This has been done by connecting an impedance 32 between the conductors 16 and 17 attached to the first inductance 11 and by connecting an impedance 33 between the leads 26 and 28 attached to the second inductance 12. The first impedance 32 has an impedance equal to half that of the legs of the bridges and the impedance 33 has an impedance equal to that of the legs of the bridges. Similar compensating impedances are shunted across the conductors attached to the inductances 14 and 15.

If desired, the middle trace, that is the record from the middle galvanometer element 23, may be omitted from the record, thus, yielding four records from five seismometers. Also, of course, any number of seismometer outputs, from two upward, may be combined in the manner illustrated. It is sometimes preferred, however, to make as many record traces as there are seismometers, and the one direct-reading trace is often rather useful.

It is apparent that if the detector driving inductance 11 is placed adjacent to the shot point and the detector driving inductance 12 is placed further from the shot point energy will appear across inductance 11 and appear on string 21 as a straight or direct first break. When the energy arrives at inductance 12 string 22 will be driven directly and show a straight first break. Meanwhile energy from inductance 12 will appear across string 21 by exciting the opposite diagonal of the bridge 18, 19, 20, 21, producing a composite signal from inductances 11 and 12 on string 21. It is apparent that the circuit shown could, if desired, be arranged to produce straight first breaks and a composite record all across the array.

Numerous minor variations and modifications will immediately be apparent to those skilled in the art and are within the scope of this invention.

What is claimed is:

1. In a multiple recording circuit that includes a plurality of circuits for supplying signals to be recorded and a plurality of recorder-operating circuits, a compositing circuit connected between at least three signal supply circuits and two recorder-operating circuits that includes two balanced bridge circuits, each of said balanced bridge circuits being comprised of one of the recorder-operating circuits and three fixed resistors connected in series across it, each resistor having a resistance equal to the resistance of the recorder-operating circuit; connections between one signal supply circuit and the diagonal corners of one of the bridge circuits; connections between another signal supply circuit and the diagonal corners of the other bridge circuit; and connections between the third signal supply circuit and the remaining pair of diagonal corners of each of the two balanced bridge circuits.

2. A compositing circuit as defined in claim 1 which further includes additional resistances shunted across the first and second signal supply circuits to balance the loads on the signal supply circuits.

ROBERT W. OLSON.

REFERENCES CITED

The following references are of record in the file of this patent:

UNITED STATES PATENTS

| Number | Name | Date |
|---|---|---|
| 2,158,198 | Prescott | May 16, 1939 |
| 2,365,218 | Rogers | Dec. 19, 1944 |